(12) United States Patent
Ozaki

(10) Patent No.: US 9,126,599 B2
(45) Date of Patent: Sep. 8, 2015

(54) ELECTRIC VEHICLE

(75) Inventor: Takayoshi Ozaki, Iwata (JP)

(73) Assignee: NTN CORPORATION, Osaka (JP)

( * ) Notice: Subject to any disclaimer, the term of this patent is extended or adjusted under 35 U.S.C. 154(b) by 0 days.

(21) Appl. No.: 14/003,413

(22) PCT Filed: Mar. 5, 2012

(86) PCT No.: PCT/JP2012/055533
§ 371 (c)(1),
(2), (4) Date: Sep. 5, 2013

(87) PCT Pub. No.: WO2012/121199
PCT Pub. Date: Sep. 13, 2012

(65) Prior Publication Data
US 2013/0345918 A1 Dec. 26, 2013

(30) Foreign Application Priority Data

Mar. 7, 2011 (JP) .................................. 2011-048632

(51) Int. Cl.
*B60W 20/00* (2006.01)
*B60W 30/188* (2012.01)
*H02K 7/116* (2006.01)
(Continued)

(52) U.S. Cl.
CPC ............ *B60W 30/188* (2013.01); *B60K 7/0007* (2013.01); *B60K 17/046* (2013.01); *B60K 17/356* (2013.01); *B60L 3/0061* (2013.01); *B60W 10/08* (2013.01); *B60W 10/184* (2013.01); *B60W 10/196* (2013.01); *H02K 7/116* (2013.01); *H02K 11/001* (2013.01); *B60K 2007/0038* (2013.01); *B60K 2007/0092* (2013.01); *B60L 2240/463* (2013.01); *B60W 2600/00* (2013.01); *H02K 11/0073* (2013.01); *H02K 2213/06* (2013.01); *Y02T 10/641* (2013.01);
(Continued)

(58) Field of Classification Search
None
See application file for complete search history.

(56) References Cited

U.S. PATENT DOCUMENTS 5,376,868 A * 12/1994 Toyoda et al. ................ 318/587
5,481,460 A * 1/1996 Masaki et al. ................ 701/50
(Continued)

FOREIGN PATENT DOCUMENTS

| CN | 1751924 | 3/2006 |
|----|---------|--------|
| CN | 1767965 | 5/2006 |

(Continued)

OTHER PUBLICATIONS

PCT International Preliminary Report on Patentability mailed Sep. 19, 2013 in corresponding International Application No. PCT/JP2012/055533.

(Continued)

*Primary Examiner* — John R Olszewski
*Assistant Examiner* — James M McPherson

(57) ABSTRACT

An electric vehicle including a plurality of motors for individually driving left and right drive wheels is provided with a motor abnormality detector for detecting the occurrence of an abnormality in each of the motors and one side abnormality response controller. The one side abnormality response controller controls, when an abnormality other than a motor stoppage is detected the motor in the wheel of either one of the left and right, which are arranged at the same forward or rearward position of the vehicle, by the motor abnormality detector, the motor for the other wheel to approach the same condition as that of the motor in which the abnormality has been detected.

11 Claims, 9 Drawing Sheets

(51) Int. Cl.
*H02K 11/00* (2006.01)
*B60L 3/00* (2006.01)
*B60K 7/00* (2006.01)
*B60K 17/04* (2006.01)
*B60K 17/356* (2006.01)
*B60W 10/08* (2006.01)
*B60W 10/184* (2012.01)
*B60W 10/196* (2012.01)

(52) U.S. Cl.
CPC ............ *Y02T 10/646* (2013.01); *Y02T 10/648* (2013.01); *Y02T 10/7258* (2013.01)

(56) References Cited

U.S. PATENT DOCUMENTS

| | | | |
|---|---|---|---|
| 7,173,386 B1 * | 2/2007 | Jeon | 318/53 |
| 7,200,482 B2 * | 4/2007 | Kawarasaki | 701/97 |
| 7,688,216 B2 * | 3/2010 | Mizutani et al. | 340/635 |
| 2009/0236157 A1 * | 9/2009 | Akamatsu | 180/55 |

FOREIGN PATENT DOCUMENTS

| | | | |
|---|---|---|---|
| CN | 101767535 | | 7/2010 |
| JP | 2004-175313 | | 6/2004 |
| JP | 2005-204436 | | 7/2005 |
| JP | 2006-256454 | * | 9/2006 |
| JP | 2006-258289 | | 9/2006 |
| JP | 2006-333603 | | 12/2006 |
| JP | 2008-61326 | | 3/2008 |
| JP | 2008-172935 | | 7/2008 |
| WO | WO 2004/085186 | | 10/2004 |

OTHER PUBLICATIONS

International Search Report mailed May 22, 2012 in corresponding International Application No. PCT/JP2012/055533.
Japanese Notice of Reason(s) for Rejection issued May 20, 2014 in corresponding Japanese Patent Application No. 2011-048632.
Japanese Notice of Reason(s) for Rejection issued Nov. 11, 2014 in corresponding Japanese Patent Application No. 2011-048632.
Chinese Office Action issued Apr. 3, 2015 in corresponding Chinese Patent Application No. 201280012030.3.

* cited by examiner

OUTBOARD SIDE ← → INBOARD SIDE

ELECTRIC VEHICLE

CROSS REFERENCE TO THE RELATED APPLICATION

This application is a U.S. national stage application of PCT/JP2012/055533 filed Mar. 5, 2012 and claims foreign priority benefit of Japanese Application No. 2011-048632 filed Mar. 7, 2011 in the Japanese Intellectual Property Office, the contents of both of which are incorporated herein by reference.

BACKGROUND OF THE INVENTION

1. Field of the Invention

The present invention relates to an electric vehicle in the form of an in-wheel motor driven vehicle or the like of a type having motors for driving individual wheels, such as, for example, a battery powered drive or a fuel battery powered drive.

2. Description of Related Art

In an electric vehicle, an in-wheel motor drive system of a type that can contribute to an improvement in driving stability of the vehicle and to an enhanced availability of a vehicle effective space. For example, a vehicle of a type, in which four wheels are driven by respective in-wheel motor drive systems, and a vehicle of a type, in which two wheels are driven by respective in-wheel motor drive systems and the remaining two wheels are used as driven wheel, are currently available in the market. Even in an electric vehicle of a type that employs no in-wheel motor drive system, an electric vehicle of a type which makes use of motors for driving individual wheels is also available in the market.

In the vehicle of a type in which four wheels or two, left and right wheels are driven by individual motors such as, for example, in-wheel motor drive systems, in the event of failure of one of the motors used to drive one of the wheels, application of a braking force to the motor in trouble leads to the spinning of the vehicle. In order to secure a postural stability of the vehicle at that occasion, both of the left and right motors are stopped.

PRIOR ART DOCUMENT

[Patent Document 1] JP Laid-open Patent Publication No. 2008-172935

SUMMARY OF THE INVENTION

As discussed above, in the event of failure of one of the left and right motors used to drive the left and right wheels, it has been a general practice to stop the left and right motors simultaneously. It has, however, been found that an abrupt stoppage of both of the wheels may often lead to a problem associated with an abrupt stoppage of the vehicle. Also, if the trouble or abnormality occurring in the motor is mild, it is desired that the posture of the vehicle is stabilized and the vehicle is then driven to the nearby repair shop or the nearest site of evacuation.

In view of the foregoing, the present invention has for its object to enable an electrically powered vehicle of a type, which employs a plurality of motors for individually driving left and right wheels, to gain a postural stability in the event of occurrence of an abnormality in one of the motors and then to be driven without the left and right motors being stopped. Hereinafter, the summary of the present invention will be described with the aid of reference numerals employed in the accompanying drawings in connection with an embodiment of the present invention.

An electric vehicle designed in accordance with the present invention is an electric vehicle including a plurality of motors 6 to individually drive left and right wheels 2 and 3 of the vehicle; a plurality of motor control devices 20 to control the respective motors 6; a motor abnormality detector 37 to detect an abnormality occurring in each of the motors 6; and an one side abnormality response controller 38 to control, in the event that an abnormality other than a motor stoppage, occurring in one motor 6 of the motors for one wheel on one side of left and right wheels 2 and 3, which are arranged at the same forward or rearward position of the vehicle, is detected by the motor abnormality detector 37, the other motor 6 for the other wheel on the other side of the wheels 2 and 3, which are arranged at the same forward or rearward position, so that an operating condition of the other motor for the other wheels approaches the same operating condition as that of the one motor in which the abnormality has been detected.

It is to be noted that the term "abnormality", which is used as occurring in the motor, is to be understood as including a malfunction in the motor 6 and a failure of the motor 6 to operate properly by reason of any causation such as, for example, a failure of a control system even when the motor 6 itself does not fail to operate properly.

According to the construction, in the event of an abnormality such as, for example, a trouble occurring in the motor 6 in one of the left and right sides of the vehicle, by the control of the one side abnormality response controller 38, the motor 6 of the other wheel 2 and 3 that is held at the same position in the forward and rearward direction as that of the wheel 2 and 3, in which the motor abnormality occurs, is controlled so as to approach the same operating condition as that of the motor 6 of which trouble has been detected. While it appears generally feasible that this control is to decelerate the rotation of the wheels 2 and 3, but if the abnormality is mild to a certain extent, that control may be to accelerate. When in this way the control is carried out to bring the motor 6 of the other wheel 2 and 3 to the operating condition that is the same as that of the motor 6 in which the abnormality has been detected, the unbalance in rotation of the left wheel 2 and right wheel 3 resulting from the trouble in motor is relieved and the stable traveling posture of the vehicle can be maintained. For this reason, in the event of the occurrence of the abnormality in one wheel, without the left and right motors being stopped the driving can be continued while the posture of the vehicle is stabilized, and, for example, the vehicle can be driven to and then parked at a safe place such as, for example, a site of evacuation on the road or to the repair shop and, thus, the vehicle is allowed to travel safely to a place where countermeasures to the trouble can be dealt with and, therefore, any measure against the motor abnormality can be taken there.

In one embodiment of the present invention, the one side abnormality response controller 38 may be operable, in the event that the abnormality detected by the motor abnormality detector 37 is a generation of a braking force on the one motor 6, to perform either one of a control to forcibly reduce a torque of the other motor 6, that is held at the same position in the forward and rearward direction, a control to operate the other motor 6 as a regenerative brake, and a control to actuate the brake 9 and 10 to the wheel 2 and 3 that is driven by the other motor 6.

While in the event of the generation of a braking force in the motor 6 of one wheel, it leads to the spinning or the like of the vehicle, the one side abnormality response controller 38 forcibly reduce the torque of the motor of the other wheel 2 and 3, which is held at the same position in the forward and rearward direction, or operates as a regenerative brake, or actuate the brake of the wheel 2 and 3 that is driven by the other motor 6. If, however, the abnormality in which the braking force is generated in the motor 6 is the generation of the braking force that is mild to a certain extent, the control to operate as the regenerative brake and the control to actuate the brake need not be performed up until the stoppage of the vehicle and the deceleration is sufficient. By performing the control to reduce the rotation of the other wheel 2 and 3 that way and by obtaining the balance in drive of the left wheel 2 and right wheel 3, it is possible for the vehicle to travel while the posture of such vehicle is stabilized.

In another embodiment of the present invention, the motor abnormality detector 37 may detect the abnormality by comparing a motor current, a rotation number, a torque command value sent to an inverter unit 22 for motor driving, and a load detection value of a load sensor 41 fitted to a wheel bearing assembly 4 for detecting an acting load between a tire and a road surface of the motors 6, which drive either the front and rear or left and right neighboring wheels 2 and 3 relative to the wheel 2 and 3 that is driven by the motor 6 forming an object to be detected, with a motor current, a rotation number, a torque command value sent to the inverter unit 22 for motor driving and a load detection value in the motor to be detected, respectively.

If the wheels 2 and 3 neighboring in the forward and rearward are usual, they attain the substantially same rotational speed. The neighboring left wheel 2 and right wheel 3 attain the same rotational speed when traveling straight ahead, but when traveling along a curved road they assume such a relation in which the rotational speed depends on, for example, the radius of curvature. Also, the driving force of the wheel 2 and 3 reflects in a load detection value of the load sensor 4. For this reason, if any of the motor current, the rotation number of the motor, the torque command value and the load detection value of the load sensor is compared with a value of the motor 6 forming the object to be detected and a value about the motor that drives the neighboring wheels 2 and 3 with respect to the motor current, the rotation number of the motor, the torque command value, the load detection value and others in the motor 6 forming the object to be detected, the abnormality occurring in the motor can be detected.

In a further embodiment of the present invention, the motor abnormality detector 37 may determine the occurrence of the abnormality in the event that the motor current detected attains value equal to or higher than a predetermined multiple number of the motor current value corresponding to the torque command value sent to the inverter unit 22 for motor driving. If the motor 6 is normal, the motor current and the motor current value corresponding to the torque command value maintain within a certain ranges. For this reason, even if the detection is made that the motor current value attains a value equal to or higher than the predetermined multiple number, the motor abnormality can be determined. It is to be noted that the predetermined multiple number referred to above and hereinafter may be 1 or more or smaller than 1 and may be suitably determined in dependence on the control purpose or the like. It is also to be noted that in the specification herein presented in connection with the present invention, it is said that the closer to zero, the higher the multiple number.

In a still further embodiment of the present invention, the motor abnormality detector 37 may determine the occurrence of the abnormality in the event that, where the motor current value is substantially equal to the motor current value corresponding to the torque command value sent to the inverter unit 22 for motor driving, the rotation number of the motor 6 forming the object to be detected attains value equal to or higher than a predetermined multiple number of the rotation number of the motor 6 in the front and rear or left and right neighboring wheels 2 and 3 relative to the wheel that is driven by this motor 6. The wording "substantially equal to" referred to above and hereinafter is to be understood as meaning within the range of the difference between the motor current value and the torque command value occurring ordinarily and whether or not it coincides substantially can be determined by suitably setting a range and then determining the coincidence of the motor current value relative to the torque command value when the difference of the current value falls within such range. Even when the motor current value coincides relative to the torque command value, it may occur that the rotation number of the motor 6 varies considerably within a certain range or the like, but between the respective motors in the neighboring front and rear or left wheel 2 and right wheel 3, the rotation number of the motor falls within a certain predetermined range if they are normal. Accordingly, a proper motor abnormality can be determined by determining the occurrence of the abnormality when it becomes equal to or higher than the predetermined multiple number of the rotation number of the motors in the neighboring front and rear or left wheel 2 and right wheel 3.

In a yet further embodiment of the present invention, the motor abnormality detector 37 may determine the occurrence of the abnormality in the event that, where the motor current value is substantially equal to the motor current value corresponding to the torque command value sent to the inverter unit 22 for motor driving, a detection load Fx in a vehicle traveling direction in a load sensor 41 fitted to a wheel bearing assembly 4, which is connected with the motor 6 forming the object to be detected, for detecting an acting load between a tire and a road surface attains value equal to or higher than a predetermined multiple number relative to a detection load Fx in the vehicle traveling direction in a load sensor 41, fitted to a wheel bearing assembly 4 of the front and rear or left and right neighboring wheels 2 and 3 relative to the wheel 2 and 3 that is driven by the motor 6 forming the object to be detected as to the presence or absence of the abnormality, for detecting acting load between the tire and the road surface. The detection load Fx in the vehicle traveling direction in the load sensor 41 for detecting the acting load between the tire, fitted to the wheel support bearing 4, and the road surface will assume a value corresponding to the motor torque. For this reason, even by comparing the detection loads Fx in the vehicle traveling direction by the load sensor 41 between the front and rear or left wheel 2 and right wheel 3, the abnormality occurring in the motor 6 can be detected.

In a yet further embodiment of the present invention, an ECU 21 which is an electric control unit for controlling the vehicle in general, a power circuitry 28 including an inverter 31 for converting a direct current power into an alternating current power, and an inverter unit 22 having a motor control circuitry 29 for controlling the power circuitry 28 in accordance with a torque command sent from the ECU 21 may be further provided, in which case the inverter unit 22 is provided for each motor, the ECU 21 and the inverter unit 22 cooperate with each other to form the motor control device 20, and the motor abnormality detector 37 and the one side abnormality responsive unit 38 are provided in the motor control circuitry 29 of the inverter unit 22. In this case, the motor abnormality detector 37 and the one side abnormality response controller 38 may be provided in the inverter unit 22. Also, the inverter unit 22 may be provided in the motor control circuitry 29, in which case the one side abnormality response controller 38 is provided in the ECU 21.

The control system employed in the electric vehicle is comprised of an ECU 21, which is generally a main equipment, and an inverter unit 22 employed for each of the motors 6. In the control system of this general format, where the present invention is desired to be applied, the use of the motor abnormality detector 37 and the one side abnormality response controller 38 in the inverter unit 22 as hereinabove discussed is effective to relieve the load on the ECU 21 that is in the process of being complicated as a result of a high functionality and, hence, the designing of the ECU 21 and the designing of the inverter unit 22 can be easily separated. By way of example, a manufacturer, who manufactures and sales a set of the motor 6 and the inverter unit 22 both in the in-wheel motor drive system, can develop out of its own original idea. With respect to the one side abnormality response controller 38, since it affects a motor 6 separate from the motor 6 that is controlled by the inverter unit 22, it may occur occasionally that the control system can be simplified if it is provided in the ECU 21, rather than in the inverter unit 22.

According to a yet further embodiment of the present invention, the motor 6 may form an in-wheel motor device 8 including a wheel bearing assembly 4 and a reducer 7 interposed between the wheel bearing assembly 4 and the motor 6. Since the in-wheel motor drive system 8 is effective to achieve a torque control independently of those wheels, it is excellent in that a fine vehicle control can be achieved, but since it results in that the left wheel 2 and right wheel 3 are individually driven, a problem arises, which is associated with the motor abnormality occurring on one side of the left wheel 2 and right wheel 3. This problem can be effectively resolved by the present invention.

The reducer 7 in the in-wheel motor drive system 8 may be a cycloid reducer. With the cycloid reducer, a high reduction ratio can be obtained through a smooth operation. Where the torque transmission to the wheels 2 and 3 through the reducer 7 having a high reduction ratio, the torque caused by the causation of the motor abnormality is, after having been amplified, transmitted to the wheels 2 and 3. Accordingly, the control to coordinate the respective drives of the left wheel 2 and right wheel 3 with each other according to the present invention becomes further effective.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF EMBODIMENTS

Figure 1:
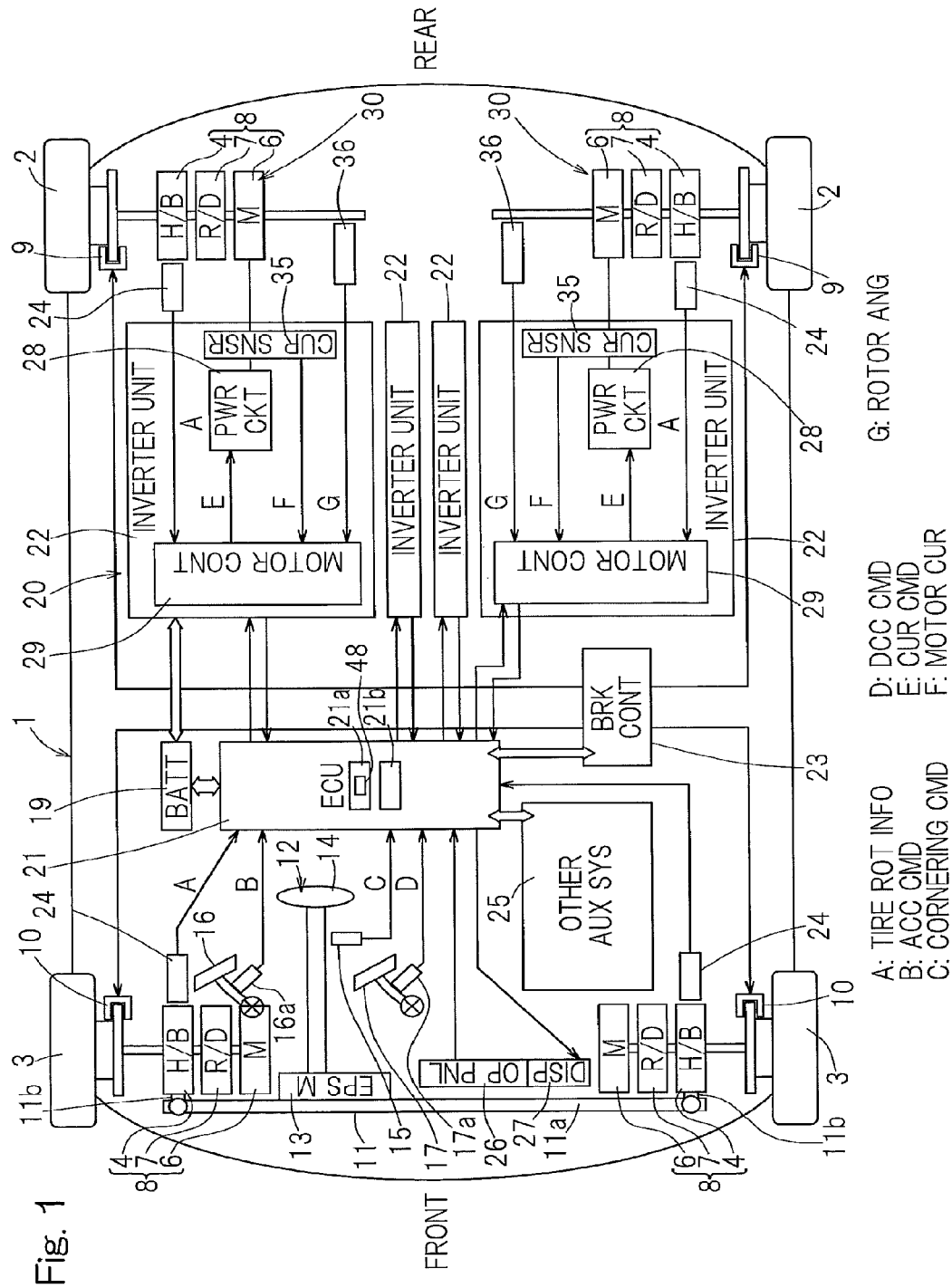
FIG. 1 is a block diagram showing a conceptual construction while an electric vehicle designed in accordance with a first embodiment of the present invention is shown in a schematic top plan view.

A first embodiment of the present invention will be described in detail with particular reference to FIGS. 1 to 4. The electric vehicle shown therein is a four-wheel drive vehicle of a type in which wheels 2, which serve as respective rear wheels 2 on left and right sides of a vehicle body 1, and wheels 3, which serve as respective front wheels 3 on the left and right sides of the vehicle body 1, shown in FIG. 1, are designed to be corresponding drive wheels. The wheels 3, which are the front wheels, are designed to be steering wheels. Each of those wheels 2 and 3 has a tire and supported by the vehicle body 1 through a respective wheel bearing assembly 4. The wheel bearing assembly 4 is indicated in FIG. 1 by "H/B" that is an abbreviation denoting a hub bearing. Each of those wheels 2 and 3 is driven by an independent motor 6 for driving. The rotation of the motor 6 is transmitted to the associated drive wheel 2 through a reducer 7 and the wheel bearing assembly 4. The motor 6, the reducer 7 and the wheel bearing assembly 4 cooperate with each other to form an in-wheel motor drive system 8 which is a single assembled component.

Figure 2:
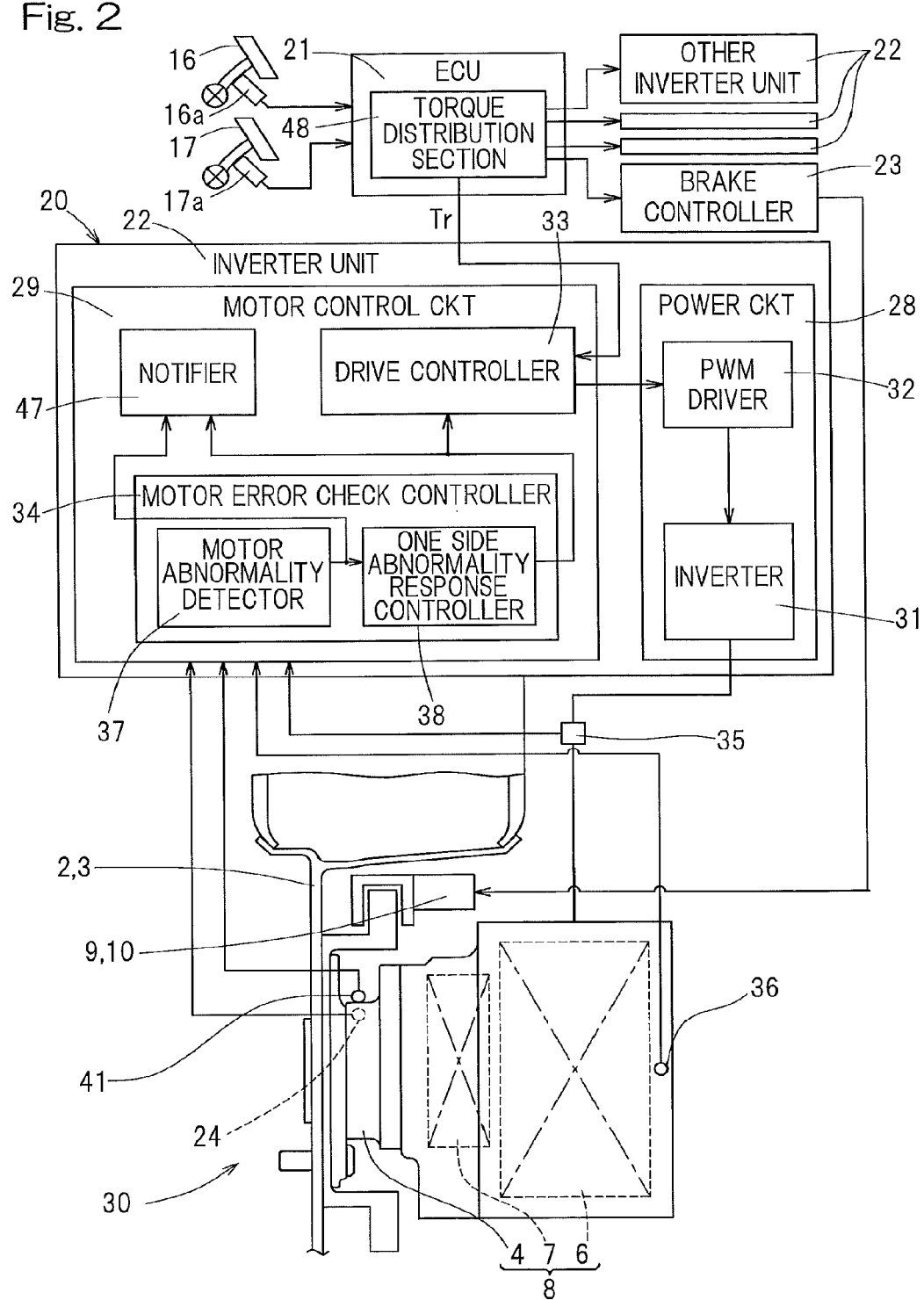
FIG. 2 is a block diagram showing a conceptual construction of an in-wheel motor unit employed in the electric vehicle.
Figure 3:
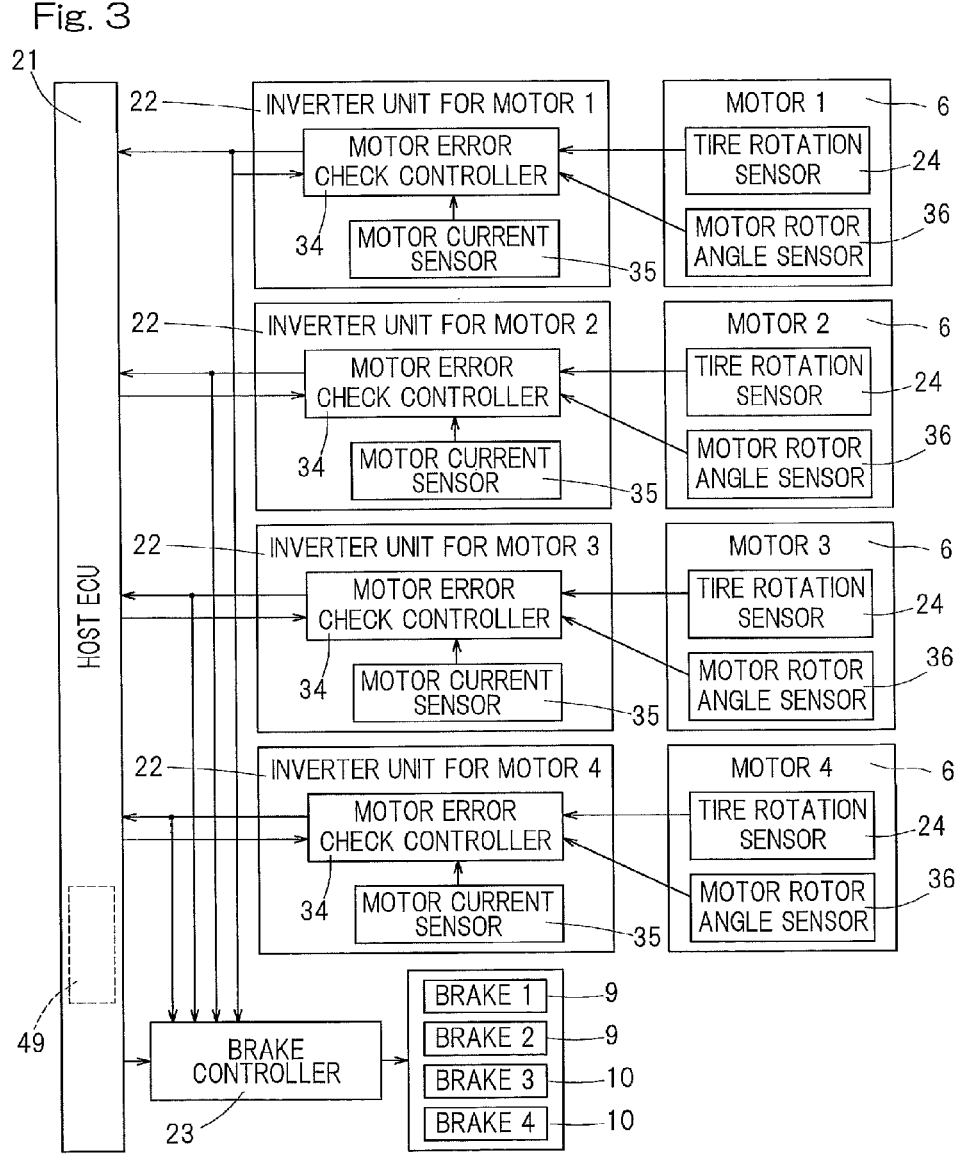
FIG. 3 is a block diagram showing a conceptual construction of an ECU, inverter units and motor error check controller.
Figure 4:
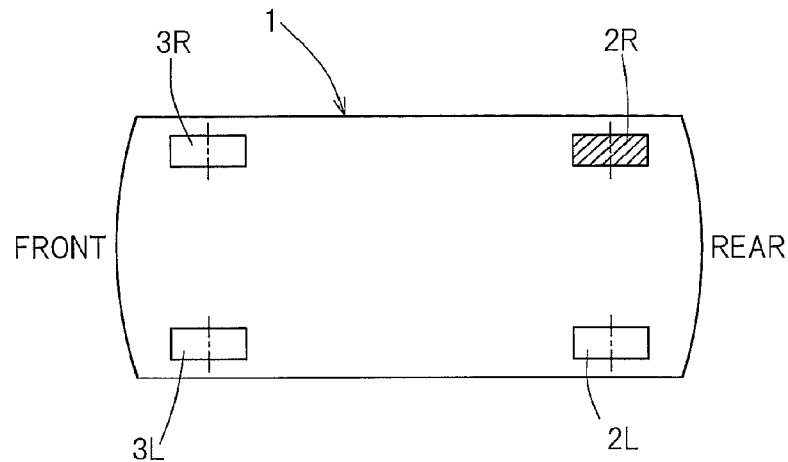
FIG. 4 is an explanatory diagram showing relations between a wheel with a malfunctioning motor and other wheels employed in the electric vehicle.

As shown in FIG. 2, the in-wheel motor drive system 8 is disposed in part, or in its entirety, in the wheel 2. The motor 6 may be capable of rotationally driving the wheel 2 directly without the reducer 7 intervening therebetween. Each of the in-wheel motor drive system 8 cooperates with an inverter unit 22, shown in FIG. 1 and as will be described later, to form an in-wheel motor unit 30. Each of the wheels 2 and 3 is provided with a mechanical brake 9 and 10, which is a frictional brake of, for example, an electrically operated type. It is to be noted that the term "mechanical" hereinabove and hereinafter used is a term used to make a distinction from a regeneration brake and is to be understood as including a hydraulic brake.

The wheels 3 and 3, which are the steering wheels serving as the left and right front wheels, are capable of being turned through a turning mechanism 11 and are steered by a steering mechanism 12. The turning mechanism 11 is a mechanism for driving a tie rod 11a in either leftward or rightward direction to change angles of a left and right knuckle arms 11b that hold the corresponding wheel bearing assemblies 4, and in response to a command from the steering mechanism 12, an EPS (electrically powered steering) motor 13 is driven to cause movement of leftwards or rightwards through a rotary-linear motion translating mechanism (not shown). The steering angle is detected by a steering angle sensor 15 and an output from this sensor is supplied to an ECU 21 and its information is used in, for example, acceleration or deceleration command for the left and right wheels.

A control system will now be described. The main ECU 21, which is an electric control unit for performing various controls for the vehicle in general, a plurality of, for example, four, inverter units 22 for performing respective controls of the associated motors 6 for driving in response to a command from the ECU 21 and a brake controller 23 are mounted on the vehicle body 1. The ECU 21 and the inverter units 22 altogether form a motor control device 20. The ECU 21 is comprised of a computer and a program executed by such computer and various electronic circuits or the like. The ECU 21 and any of other computers may be, for example, microcomputers.

The ECU 21 may be generally divided, based on the function, into a drive control section 21a for performing a control associated with the drive and a general control section 21b for performing any other control. The drive control section 21a includes a torque distribution section 48. This torque distribution section 48 generates from an acceleration command outputted by an accelerator operating unit 16, a deceleration command outputted by a brake operating unit 17 and a turning command outputted by a steering angle sensor 15, acceleration/deceleration command to be sent to the driving motors 6 and 6 for the left and right wheels as a torque command value and then outputs the torque command value to the inverter unit 22. The torque distribution section 48 referred to above has a function of allocating, in the event of the deceleration command outputted by the brake operating unit 17, the deceleration command to a braking torque command value for operating the motor 6 as a regeneration brake and to a braking torque command value for actuating the mechanical brakes 9 and 10. The braking torque command value for operating as the regeneration brake is reflected in the torque command values for the acceleration/deceleration command to be applied to each of the driving motors 6 and 6. The braking torque command value for actuating the mechanical brakes 9 and 10 is outputted to a brake controller 23.

The torque distribution section 48 may have, in addition to the above, a function of correcting the acceleration/deceleration command to be outputted with the use of information on the rotation number of the tire, which is obtained from a rotation sensor 24 provided in the wheel bearing assembly 4 for each of the wheels 2 and 3, and information from other vehicle mounted sensors. The accelerator operating unit 16 is comprised of an accelerator pedal and a sensor 16a for outputting the acceleration command by detecting the amount of depression of the accelerator pedal. The brake operating unit 17 is comprised of a brake pedal and a sensor 17a for outputting the deceleration command by detecting the amount of depression of the brake pedal.

The general control section 21b of the ECU 21 has a function of controlling various auxiliary systems, a function of processing input commands from an operating panel 26 on a console, and a function of causing a display unit 27 to display. The auxiliary systems 25 referred to above includes, for example, an air conditioner, lights, wipers, a GPS, air bags and others and, for the purpose of simplicity, those auxiliary systems 25 are shown by, and referred to as, a single block in the accompanying drawings.

The brake controller 23 referred to above provides a braking command to the mechanical brakes 9 and 10 of each of the wheels 2 and 3 in dependence on a braking command outputted from the ECU 21 and includes electronic circuits, a microcomputer and others used as an ECU for exclusive use for braking The braking commands outputted from the main ECU 21 includes, in addition to the command generated by the deceleration command outputted by the brake operating unit 17, a command generated by a unit for improving the safety that is possessed by the ECU 21. The brake controller 23 is additionally provided with an anti-lock brake system.

The inverter unit 22 includes a power circuitry 28 provided for each of the motors 6 and a motor control circuitry 29 for controlling the power circuitry 28. The motor control circuitry 29 has a function of outputting to the ECU 21 various pieces of information (hereinafter, referred to as "IWM system information") on various detection values, control values and others which are possessed by the motor control circuitry 29 and are related to the in-wheel motor drive system 8.

FIG. 2 is a block diagram showing a conceptual construction of the in-wheel motor unit 30. The power circuitry 28 of the inverter unit 22 is made up of an inverter 31 for converting a direct current power of a battery 19, best shown in FIG. 1, into a three phase alternating current power that is used to drive the motor 6, and a PWM driver 32 for controlling the inverter 31. The motor 6 is comprised of a three phase synchronous motor such as, for example, an IPM (Interior Permanent Magnet) type synchronous motor. The inverter 31 referred to above includes a plurality of semiconductor switching elements (not shown). The PWM driver 32 is operable to modulate an inputted current command into a pulse width to thereby apply an ON/OFF command to each of the semiconductor switching elements.

The motor control circuitry 29 referred to above is made up of a computer, a program executed by such computer, and electronic circuits. This motor control circuitry 29 converts, in accordance with the acceleration/deceleration command based on a torque command and others supplied from the ECU 21, which is a host control unit, the acceleration/deceleration command into current command, and then send the current command to the PWM driver 32 of the power circuitry 28. Also, the motor control circuitry 29 performs a current feedback control by obtaining a motor current value, which is to be supplied from the inverter 31 to the motor 6, from a current sensor 35. In this current control, a control that depends on a rotation angle, such as vector control and others, is performed based on a rotation angle of a rotor of the motor 6 obtained from an angle sensor 36.

In the embodiment now under discussion, the motor control circuitry 29 is provided with a motor error check controller 34, which includes the following motor abnormality detector 37 and a one side abnormality response controller 38, and an abnormality notifier 47. The motor abnormality detector 37 is operable to detect the occurrence of an abnormality in the motor 6 that is driven by the inverter unit 22 provided with this motor abnormality detector 37. It is to be noted that the "abnormality" in the motor referred to here is intended to mean as including a malfunction in the motor 6 and a failure of proper operation of the motor 6 for reason of any causation such as, for example, a failure of a control system even through the motor 6 itself does not fail to operate properly.

The one side abnormality response controller 38 is operable, in the event that an abnormality in the motor 6 other than a stoppage of the motor 6 has been detected by the motor abnormality detector 37, that is, an abnormality other than the stoppage of motor occurring in one motor 6 for one wheel of one side of the left wheel 2 or right wheel 3, which are arranged at the same forward or rearward positions of the vehicle, has been detected, to control the other motor 6 for the other of the wheels 2 or 3, which are arranged at the same forward or rearward positions of the vehicle, so that an operating condition of the other motor 6 for the other of the wheels 2 or 3 approaches the same operating condition as that of the one motor in which the abnormality has been detected. For example, the one side abnormality response controller 38 controls, in the event that an abnormality has been found occurring in one motor 6 employed for a right rear wheel 2R of the rear wheels shown in FIG. 4, the other motor 6 for the other left rear wheel 2L of the rear wheels so that the operation condition of the other motor 6 approaches the operating condition same as that of the one motor 6 which the abnormality has been detected.

As described above, by controlling the motor 6 in the other of the left wheel 2 and right wheel 3 so as to approach the same operating condition as that of the motor 6 in which the abnormality has been detected, the rotational unbalance between the left wheel 2 and right wheel 3 resulting from the occurrence of the motor abnormality can be relieved and the driving posture of the vehicle can be maintained stable. For this reason, in the event of occurrence of an abnormality of only one of the motors 6, without the motors 6 on both of the left and right sides being stopped, it is possible to take such a countermeasure to the motor abnormality that the posture of the vehicle can be stabilized to allow the vehicle to be driven to a safe zone on the road such as, for example, the site of evacuation on the road or to the nearest repair shop. The above described control to approach the same operating condition may be such as to control to decelerate the rotations of the wheels 2 and 3, but it may be a control to accelerate should the abnormality is mild to a certain extent. Determination of whether the abnormality is mild to a certain extent as referred to above can be accomplished by a value suitably set in the one side abnormality response controller 38.

The one side abnormality response controller 38 may be capable of performing, in the event that the abnormality detected by the motor abnormality detector 37 is a generation of a braking force is generated in the motor 6, one or more of a control of forcibly reducing the torque of the other motor 6 of the motors held at the same forward or rearward position, a control of operating the other motor 6 as a regenerative brake, and a control of actuating a brake 9 or 10 for the wheel 2 or 3 that is driven by the other motor 6. Where the control to forcibly reduce the torque of the other motor 6 or the control to operate the motor 6 as the regenerative brake is carried out, control may be carried out through the torque distribution section 48 of the ECU 21 or arrangement may be made to send a control command directly between the inverter units 22. Where the control to actuate the brake 9 or 10 is carried out, it is carried out through the brake controller 23.

In the event that the braking force is generated in the motor 6 for one wheel which is on either one of the left and right sides, there is a possibility that the vehicle may undergo a spinning or the like, but by the one side abnormality response controller 38, the torque of the motor 6 in the wheel 2 or 3 on the other of the left and right sides held at the same positions in the forward and rearward direction is forcibly reduced or the brake in the wheel 2 or 3 that is driven the other motor 6 is actuated to render respective drives of the left wheel 2 and right wheel 3 to be counterbalanced, so that the vehicle can be driven while the posture of the vehicle is stabilized. If the abnormality in which the braking force is generated in the motor 6 is the generation of the braking force that is mild to a certain extent, the control of operating as the regenerative brake or the control to actuate the brake need not be performed up until the stoppage of the vehicle and the control may be the deceleration. As discussed above, when the control to reduce the rotation of the other wheel 2 or 3 is reduced to render the respective drives of the left wheel 2 or right wheel 3 to be counterbalanced, it is possible to run while the posture of the vehicle is stabilized. Whether or not the braking force is mild to a certain extent has to be suitably set and judged.

Where the one side abnormality response controller 38 is provided in each of the inverter unit 22 and the control responsive to the occurrence of the abnormality is performed directly between the inverter units 22 without relying on the ECU 21, the motor control circuitry 29 of each of the inverter units 22 may have a function of performing a motor control in dependence on a command outputted by the one side abnormality response controller 38 provided in the other Inverter unit 22.

The manner of detecting the motor abnormality will now be described. The motor abnormality detector 37 referred to previously may be so designed as to detect the occurrence of a motor abnormality by comparing any one of the motor current, the rotation number of such motor, a torque command value Tr to be sent to the inverter unit 22 for a motor driving, and a load detection value of a load sensor 41 fitted to the wheel bearing assembly 4 for detecting an acting load between the tire and the road surface of the motor 6 that drives the neighboring wheel 2 or 3 on either one of front and rear side and either one of the left and right side with respect to the wheels 2 and 3 that are driven by the motor 6 that forms an object to be detected, with any one of the motor current, the rotation number of such motor, a torque command value sent to the inverter unit 22 for motor driving and the load detection value in the motor 6 which forms the object to be detected, respectively.

In the motor abnormality detector 37, the detection value of the motor current of the motor 6 is employed in the form of a detection value detected by the current sensor 35. The rotation number of the motor is obtained from the angle sensor 36. The torque command value Tr to be sent to the inverter 22 for the motor driving is a command value given by distributing by means of the torque distribution section 48. With respect to the load sensor 41, a specific example will be described later with reference to FIGS. 9 to 11.

The neighboring wheels 2 and 3 neighboring on the front and rear sides will ordinarily attain the same rotational speed. The wheels 2 and 3 neighboring on the left and right sides (in other words, both of the rear wheels and both of the front wheels) attain the same rotational speed when the vehicle travels along a straight roadway and will, when the vehicle travels along a curved roadway, be held in such a relation that the respective rotational speeds may be determined in dependence on the radius of curvature. Also, respective driving forces of the wheels 2 and 3 appear in respective load detection values of the load sensors 4. For this reason, for any one of the motor current, the rotation number of the motor, the torque command value, and the load detection value of the load sensor, if the motor 6 forming the object to be detected and the motors 6 that drive the neighboring wheels 2 and 3 are compared with each other, the occurrence of the motor abnormality can be detected.

The motor abnormality detector 37 may be so designed that the motor current can be determined as abnormal in the event that the motor current corresponding to the torque command value Tr to be sent to the inverter unit 22 for motor driving attains a value equal to or greater than a predetermined multiple number. If the motor 6 is normal, the motor current and the motor current value corresponding to the torque command value fall within a certain range. Because of this, even when it is detected that the motor current value attains the value equal to or greater than the predetermined multiple number, the occurrence of the motor abnormality can be determined. It is to be noted that the term "predetermined multiple number" referred to above and hereinafter is to be understood as a value equal to or greater than 1 or smaller than 1 and may be suitably set in consideration of the purpose for which the control is made.

Other than that, the motor abnormality detector 37 may be so designed that in the event that the motor current value is substantially equal to a motor current value corresponding to the torque command value Tr to be sent to the inverter unit 22 for motor driving, the occurrence of the abnormality can be determined when the rotation number of the motor 6, which is the object to be detected, attains a value equal to or greater than the predetermined multiple number of the rotation number of the motor in the forwardly and rearwardly or leftwardly and rearwardly neighboring wheels 2 and 3 relative to the wheel that is driven by this motor 6. The wording "substantially equal to" referred to above and hereinafter is to be understood as meaning that it is within a range of difference between the torque command value and the motor current value that occurs ordinarily and whether or not it is substantially equal may be determined as such when by setting a suitable determination the difference of the current value lies within that range.

Although it may occur that even when the motor current value is equal to a value corresponding to the torque command value, the rotation number of the motor 6 changes within a certain range, in a normal condition the number of rotation of the motor falls to a certain extent within a predetermined range between the motors in the forward and rearward or leftward and rightward neighboring wheels 2 and 3. Accordingly, by determining the occurrence of the abnormality when it becomes equal to or greater than the predetermined multiple number of the rotation number of the motors in the forwardly and rearwardly or leftwardly and rightwardly neighboring wheels 2 and 3, a proper determination of the occurrence of the motor abnormality can be accomplished.

Also, the motor abnormality detector 37 may be so designed that in the event that the motor current value is substantially equal to the motor current value corresponding to the torque command value to be sent to the inverter unit 22 for motor driving, the occurrence of the abnormality can be determined when a detection load Fx in a direction of travel of the vehicle in the load sensor 41 for detecting the acting load between the tire and the road surface, which sensor is fitted to the wheel bearing assembly 4 connected with the motor 6, that is the object to be detected, attains a predetermined multiple number of a detection load Fx in the direction of travel of the vehicle in the load sensor 41 for detecting the acting load between the tire and the road surface, which sensor is fitted to the wheel support bearing assemblies for the forwardly and rearwardly or leftwardly and rightwardly neighboring wheels 2 and 3 relative to the wheels 2 and 3 that are driven by the motors 6 forming the objects to be detected. The detection load Fx in the direction of travel of the vehicle in the load sensor 41 for detecting the acting load between the tire and the road surface, which is fitted to the wheel bearing assembly 4, is a value corresponding to the motor torque. For this reason, by comparing the detection loads Fx in the direction of travel of the vehicle by the load sensor 41 between the forwardly and rearwardly or leftwardly and rightwardly wheels 2 and 3, the occurrence of the abnormality in the motor 6 can be detected.

The notifier 47 transmits a signal, which represents a report on the abnormality detection and/or the response to such abnormality, to the ECU 21 in the event that the motor abnormality is detected by the motor abnormality detector 37, or in the event that a response processing is performed by the one side abnormality response controller 38 relative to the motor abnormality, or in the event of the both. The ECU 21 is provided with a unit for performing a corresponding control in response to the report from the abnormality notifier 47, and/or a unit for causing the display unit 27 in the console to make a display to be informed to the driver (both units being collectively shown as a ECU responsive control unit 49 in FIG. 2).

By way of example, when the one side abnormality response controller 38 performs the control responsive to the motor abnormality, the ECU 21, in the event that the notifier 47 reports control contents responsive to that abnormality to such ECU 21, performs a suitably determined control in order to conduct a coordinated control for the entire vehicle and, also, causes the display unit 27 in the console to perform the display necessary to advise the driver about the occurrence of the abnormality in the motor 6 and execution of the control appropriate thereto. The display of the occurrence of the abnormality may be performed in response to a signal descriptive of the detection of the abnormality by means of the motor abnormality detector 37.

According to the electric vehicle of the structure described hereinabove, since in the event of the occurrence of the abnormality in the motor 6 on one side the control is performed to cause the operating condition of the motor 6 in the other wheel 2 or 3 to approach the same operating condition as that of the motor 6 for which the abnormality has been detected, the rotational unbalance between the left wheel 2 and right wheel 3 resulting from the motor abnormality can be relieved and the posture of the vehicle during the travel can be stabilized.

Since in the embodiment hereinabove described the in-wheel motor drive system 8 is employed for the motor 6, it is excellent in terms of downsizing, but since the wheels 2 and 3 are individually driven, a problem may arise which is associated with the motor abnormality occurring only one side of the left and right wheels. This problem can be effectively resolved as hereinbefore discussed. Since the reducer 7 employed in the in-wheel motor drive system 8 is chosen to be a cycloid reducer, a high reduction ratio can be obtained with a smooth operation. However, where a torque transmission is made to the wheels 2 and 3 through the reducer 7 having a high reduction ratio, the torque, which has led to the motor abnormality, is transmitted to the wheels 2 and 3 after having been amplified. For this reason, the control provided in the left and right drives according to this embodiment of the present invention can become further effective.

Also, since the motor abnormality detector 37 and the one side abnormality response controller 38 are provided in the inverter unit 22, burden on the ECU 21, which is in a process of being complicated as a result of a high functionality, can be lessened and a designing of the ECU 21 and a designing of the inverter unit 22 can be easily separated from each other. For example, a trader, who manufactures and sales a set of the motor 6 and the inverter unit 22 both in the in-wheel motor drive system, can develop out of its own original idea.

Figure 5:
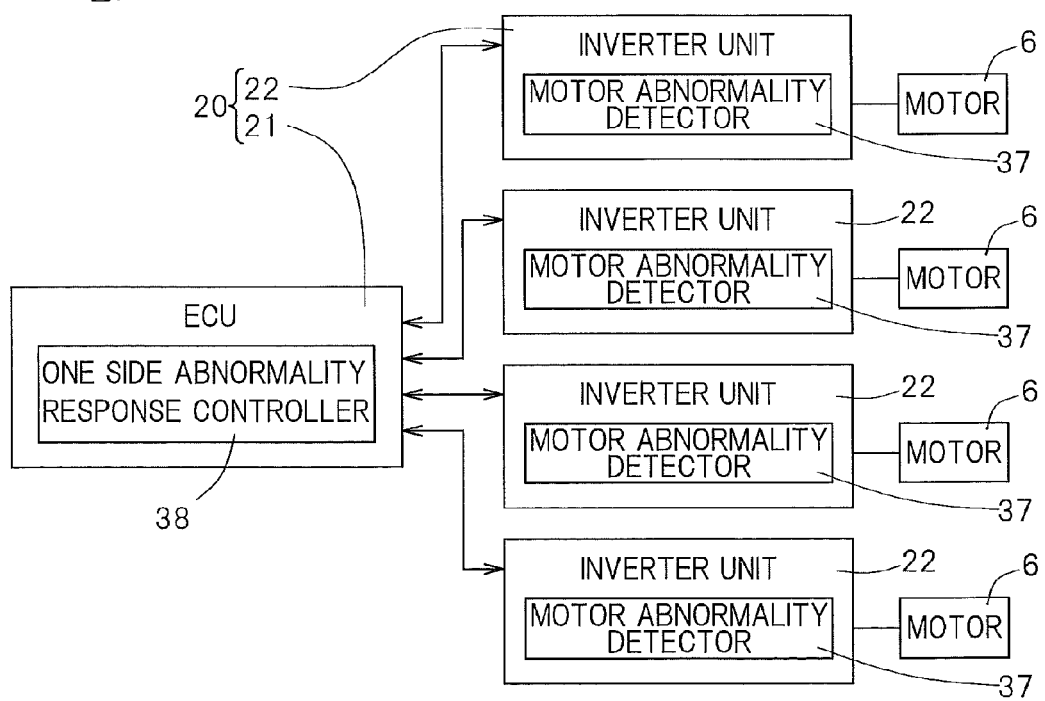
FIG. 5 is a block diagram showing a conceptual construction of a control system of the electric vehicle designed in accordance with a second embodiment of the present invention.

It is to be noted that the one side abnormality response controller 38 may be provided in the ECU 21 as is the case with a second embodiment shown in FIG. 5. The control by the one side abnormality response controller 38 affects a different motor 6 separate from the motor 6 that is controlled by the inverter unit 22 provided with such one side abnormality response controller 38 and, therefore, it may occur that the provision of one side abnormality response controller 38 in the ECU 21, rather than in the inverter unit 22, may result in simplification of the control system. Other than that, the motor abnormality detector 37 and the one side abnormality response controller 38 may be provided both in the ECU 21.

A specific example of the in-wheel motor drive system 8 will be shown in and described with reference to FIGS. 6 to 8. The in-wheel motor drive system 8 according to this specific example, is of a structure in which the reducer 7 is interposed between the wheel bearing assembly 4 and the motor 6 and a hub of the drive wheel 2 supported by the wheel bearing assembly 4 and a rotary output shaft 74 of the motor 6 are connected coaxially with each other about a common axis. The reducer 7 is in the form of a cycloid reducer, in which eccentric portions 82*a* and 82*b* are formed in the rotary input shaft 82 coaxially connected with the rotary output shaft 74 of the motor 6, and curved plates 84*a* and 84*b* are mounted on the respective eccentric portions 82*a* and 82*b* through associated bearings 85 so that respective eccentric motion of the curved plates 84*a* and 84*b* can be transmitted to the wheel bearing assembly 4 as a rotary motion. It is to be noted that hereinafter in this specification, terms "outboard" and "inboard" represent one side of the vehicle body away from the longitudinal center of the vehicle body and the other side of the vehicle body close to the longitudinal center of the vehicle body, respectively, when assembled in the vehicle body.

The wheel bearing assembly 4 includes an outer member 51 having an inner periphery formed with a plurality of rows of rolling surfaces 53, an inner member 52 having an outer periphery formed with rolling surfaces 54 in face to face relation with the rolling surfaces 53, and a plurality of rows of rolling elements 55 interposed between the respective rolling surfaces 53 and 54 of the inner and outer members 51 and 52. The inner member 52 concurrently serves as a hub to which the drive wheel is fitted. This wheel bearing assembly 4 is rendered to be a dual row angular contact ball bearing and the rolling elements 55 are in the form of balls that are retained by a retainer 56 for each row. Each of the rolling surfaces 53 and 54 is of an arcuate sectional shape and those rolling surfaces 53 and 54 are so formed as to assume a back-to-back relation to each other. A bearing space delimited between the outer member 51 and the inner member 52 has an outboard end sealed by a sealing member 57.

The outer member 51 serves as a stationary side raceway ring and is of one piece construction including a flange 51*a* that is fitted to a housing 83*b* on an outboard side of the reducer 7. The flange 51*a* is provided with a bolt insertion hole 64 at a plurality of locations in a circumferential direction. Also, the housing 83*b* is provided with a bolt threading hole 94 at a position corresponding to the bolt insertion hole 64, which hole 94 has an inner periphery formed with threads. When the mounting bolt 65, then having been inserted into the bolt insertion hole 64, is threaded in the bolt threading hole 94, the outer member 51 is fitted to the housing 83*b*.

The inner member 52 serves as a rotatable side raceway ring and includes an outboard side member 59, having a hub flange 59*a* formed therein, and an inboard side member 60 integrated together with the outboard side member 59 by mounting and crimping an outboard side to an inner periphery of the outboard side member 59. The rows of the rolling surfaces 54 of each row are formed in the outboard side member 59 and the inboard side member 60, respectively. The inboard side member 60 is provided with a throughhole 61 at a center thereof. The hub flange 59*a* is provided with a press fitting hole 67 at a plurality of circumferential locations for receiving a corresponding hub bolt 66. In the vicinity of a root portion of the hub flange 59*a* of the outboard side member 59, a cylindrical pilot portion 63 for guiding the drive wheel and a brake component (not shown) protruded towards the outboard side. This pilot portion 63 has an inner periphery to which a cap 68 for closing an outboard end of the throughhole 61 referred to above.

The reducer 7 is the cycloid reducer as hereinbefore described and the two curved plates 84*a* and 84*b*, each having an outer contour formed according to a smoothly wavy trochoidal curve, are mounted on the eccentric portions 82*a* and 82*b* of the rotary input shaft 82 through the respective bearings 85. A plurality of outer pins 86 for guiding the eccentric motions of those curved plates 84*a* and 84*b* on an outer peripheral side are provided straddled in the housing 83*b* and a plurality of inner pins 88 fitted to the inboard side member 60 of the inner member 2 are engaged in an inserted fashion in a plurality of round throughholes 89 provided inside of the curved plates 84*a* and 84*b*. The rotary input shaft 82 is splined to the rotary output shaft 74 of the motor 6 for rotation together therewith. It is to be noted that the rotary input shaft 82 referred to above is supported at its opposite ends by the housing 83*a* on the inboard side and an inner diametric surface of the inboard side member 60 of the inner member 52 through two bearings 90.

When the output shaft 74 of the motor 6 rotates, the curved plates 84*a* and 84*b* fitted to the rotary input shaft 82 that rotates together therewith undergo the respective eccentric motions. Those eccentric motions of the curved plates 84*a* and 84*b* are transmitted as a rotary motion to the inner member 52 by means of the engagement between the inner pins 88 and the throughholes 89. The rotation of the inner member 52 becomes reduced relative to the rotation of the rotary output shaft 74. By way of example, with a cycloid reducer of one stage, the reduction ration of 1/10 or higher can be obtained.

The previously described two curved plates 84*a* and 84*b* are mounted on the respective eccentric portions 82*a* and 82*b* of the rotary input shaft 82 having been displaced 180° relative to each other so that the eccentric motions can be counterbalanced, and on opposite sides of each of the eccentric portions 82*a* and 82*b*, a counterweight 91, which is made eccentric in a direction counter to the direction of eccentricity of the corresponding eccentric portion 82*a* and 82*b*, is mounted so that vibrations caused by the eccentric motion of the corresponding curved plate 84*a* or 84*b* can be counterbalanced.

Figure 8:
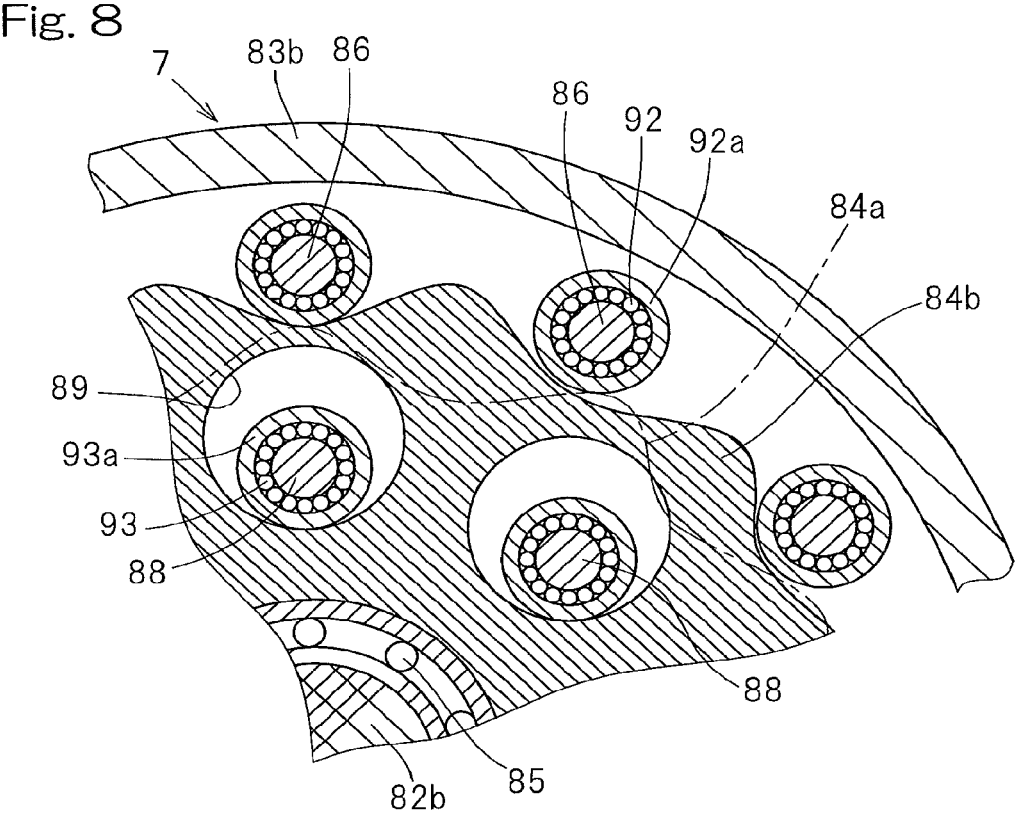
FIG. 8 is a fragmentary enlarged sectional view showing a portion of FIG. 7.

As shown in FIG. 8 on an enlarged scale, each of the outer pins 86 and each of the inner pins 88 have respective bearings 92 and 93 mounted thereon, and outer rings 92*a* and 93*a* of those bearings 92 and 93 are made to rollingly contact the outer peripheries of the curved plates 84*a* and 84*b* and the inner peripheries of the throughholes 89. Accordingly, the contact resistance between the outer pins 86 and the curved plates 84*a* and 84*b* and the contact resistance between the inner pins 88 and the throughholes 89 are reduced and the eccentric motions of the curved plates 84a and 84b can therefore be transmitted as the rotary motion smoothly to the inner member 52.

Figure 6:
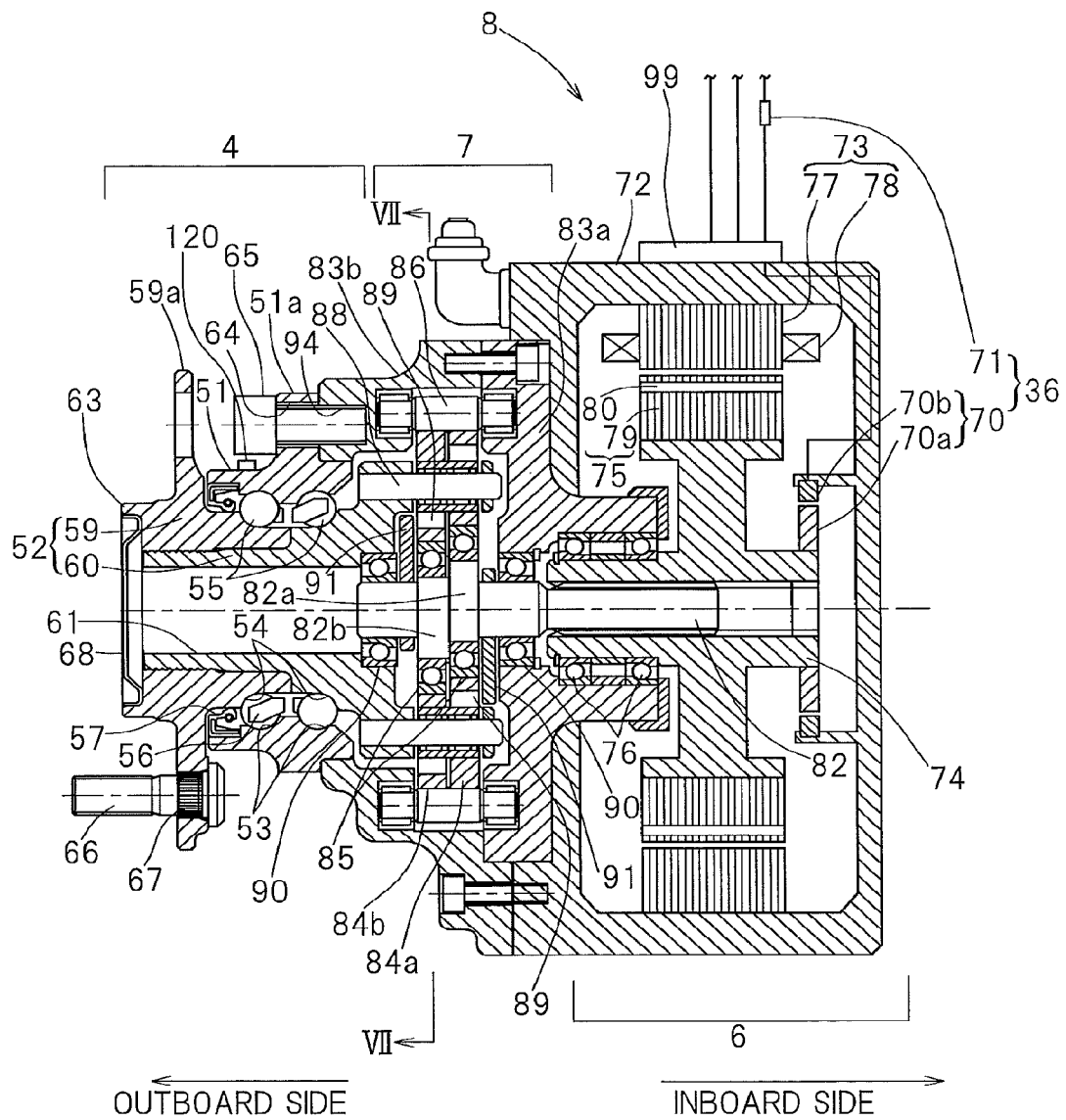
FIG. 6 is a front elevational view, with a portion broken away, showing an in-wheel motor drive system employed in the electric vehicle designed in accordance with any one of the embodiments.
Figure 7:
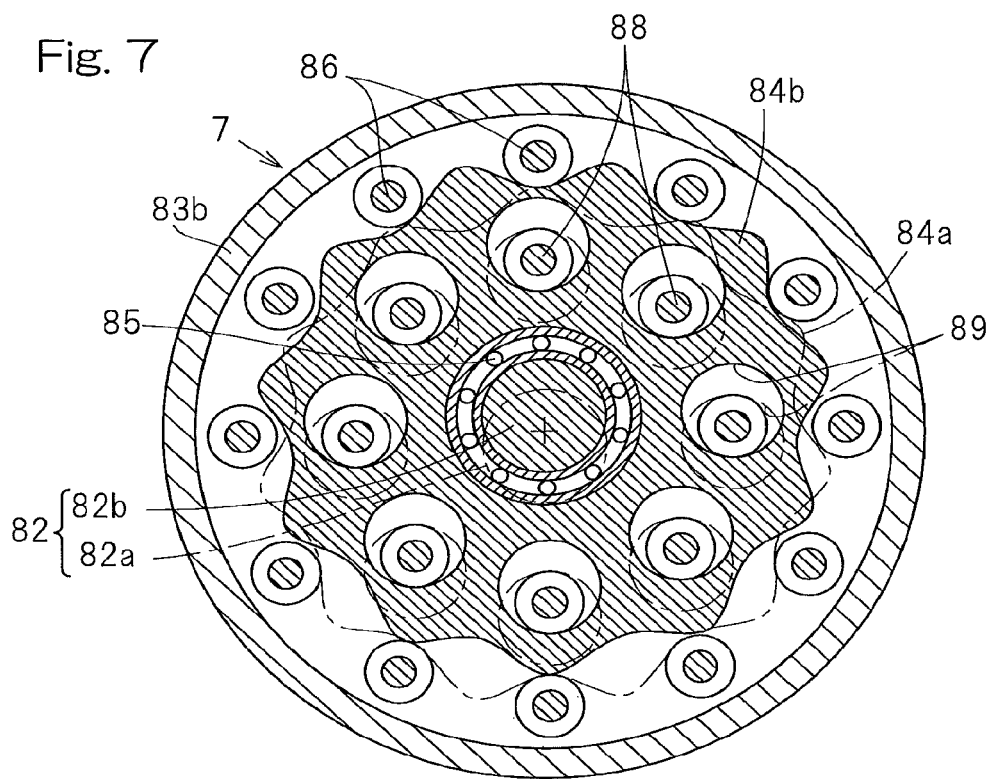
FIG. 7 is a cross sectional view taken along the line VII-VII in FIG. 6.

Referring to FIG. 6, the motor 6 is in the form of an IPM (Interior Permanent Magnet) motor of a radial gap type in which a radial gap is provided intermediate between a motor stator 73, fixed to a cylindrical motor housing 72, and a motor rotor 75 fitted to the rotary output shaft 74. The rotary output shaft 74 is supported in a cantilever fashion by two bearings 76 within a tubular portion of the housing 83a on the inboard side of the reducer 7.

The motor stator 73 is comprised of a coil 78 and a stator core portion 77 made of a soft magnetic material. The stator core portion 77 is held by the motor housing 72 with its outer peripheral surface mounted on an inner peripheral surface of the motor housing 72. The motor rotor 75 is comprised of a rotor core portion 79, mounted on the rotary output shaft 74 in coaxial relation with the motor stator 73, and a plurality of permanent magnets 80 built in the rotor core portion 79.

The motor 6 referred to above is provided with the angle sensor 36 for detecting the angle of relative rotations between the motor stator 73 and the motor rotor 75. This angle sensor 36 has a angle sensor main body 70 for detecting and outputting a signal descriptive of the angle of the relative rotations between the motor stator 73 and the motor rotor 75 and an angle calculating circuit 71 for calculating the angle from the signal outputted from the angle sensor main body 70. The angle sensor main body 70 is made up of the to-be-detected portion 70a, provided on an outer peripheral surface of the rotary output shaft 74, and a detecting portion 70b provided in the motor housing 72 and positioned at a location close to the to-be-detected portion 70a so as to face towards the latter in, for example, a radial direction. The to-be-detected portion 70a and the detecting portion 70b may be positioned close to each other so as to face in a shaft axis direction. In the instance now under discussion, as each of the angle sensors 36, a magnetic encoder or a resolver, for example, is employed. The rotation control of the motor 6 is carried out by the motor control circuitry 29 (shown in FIGS. 1, 2). In this motor 6, in order to maximize the efficiency thereof, on the basis of the angle of the relative rotations between the motor stator 73 and the motor rotor 75 that is detected by the angle sensor 36, the timing of application of each of the phases of each wave of an alternating current to be supplied to the coil 78 of the motor stator 73 is so designed as to be controlled by a motor drive controller 33 of the motor control circuitry 29.

It is to be noted that wirings for the motor current of the in-wheel motor drive system 8 and wiring for various sensor systems and command systems are bundled together by a connector 99 provided in, for example, the motor housing 72.

Figure 9:
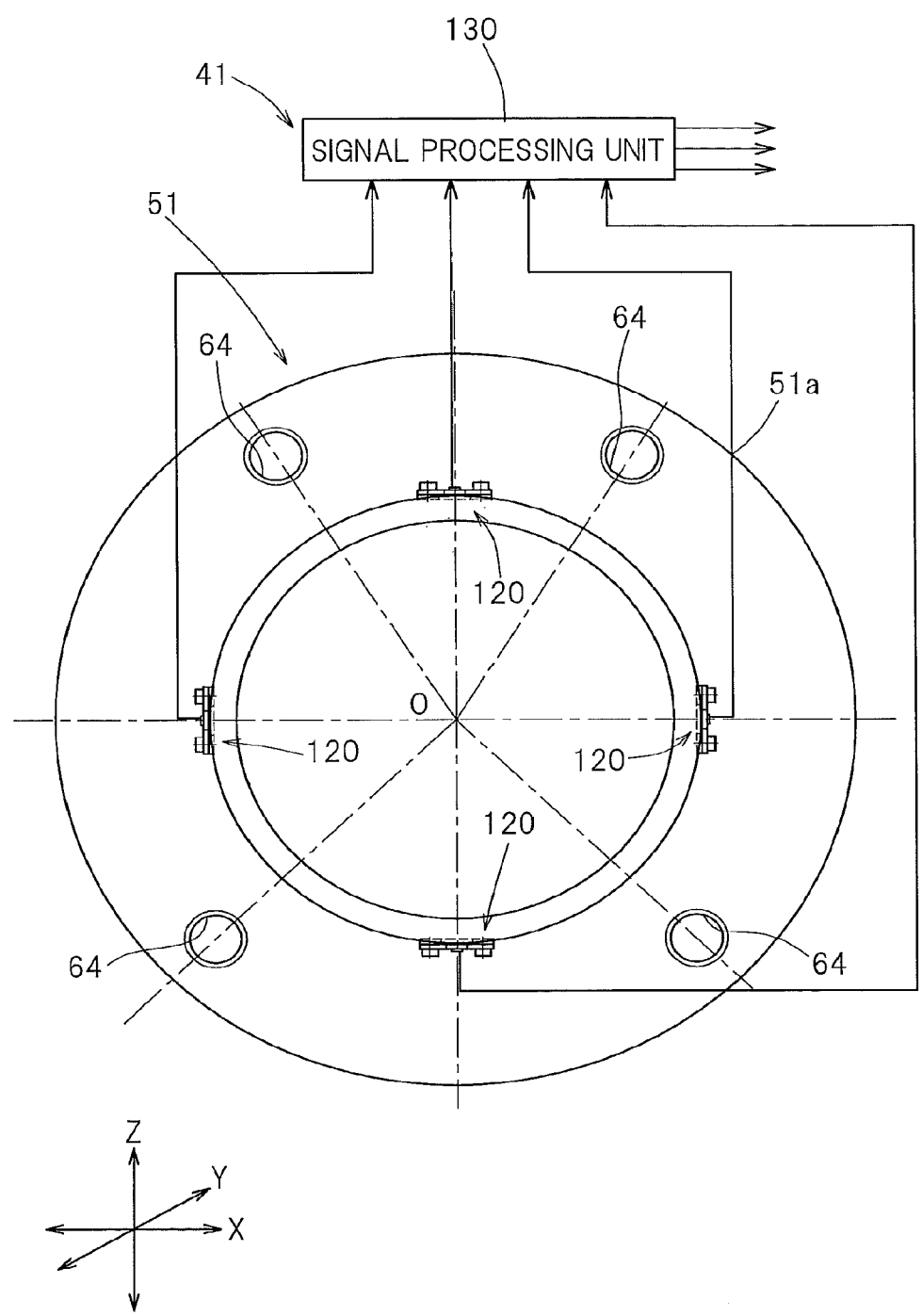
FIG. 9 is a diagram showing a combination of a side view of a wheel bearing assembly and an outer member, both employed in the electric vehicle, with a signal processing unit for a load detection.

The load sensor 24 best shown in FIG. 2 is comprised of, for example, a plurality of sensor units 120, best shown in FIG. 9, and a signal processing unit 130 for processing output signals from those sensor units 120. The sensor units 120 are provided at four locations on an outer diametric surface of the outer member 51 which is the stationary side raceway ring of the wheel bearing assembly 4. FIG. 8 illustrates a front elevational view of the outer member 1 as viewed from the outboard side. In this instance, those sensor units 120 are provided at upper, lower, right and left surface portions of the outer diametric surface of the outer member, which will become upper, lower, left and right positions relative to a tire tread surface. The signal processing unit 130 may be provided in the outer member 51 or in the motor control circuitry 29 of the inverter unit 22.

The signal processing unit 130 compares respective outputs of the sensor units 120 at the above described four locations, calculates and outputs various loads acting on the wheel bearing assembly 4, more specifically a direct direction load Fz which will become an acting load between the road surface and the tire of the wheel 2, a vehicle traveling direction load Fx which will become a driving force or a braking force, and an axial direction load Fy, in accordance with a predetermined arithmetic expression. Since the sensor unit 120 is provided in four in number and each of the sensor units 120 is disposed at the upper, lower, right and left surface portions of the outer diametric surface of the outer member, which will become the top, bottom, left and right positions relative to the tire tread surface, and equidistantly spaced from each other at an angle of 90° in phase difference in the circumferential direction, the vertical direction load Fz, the vehicle traveling direction load Fx and the axial direction load Fy, which act on the wheel bearing assembly 4, can be accurately estimated. The vertical direction load Fz is obtained by comparing respective outputs of the upper and lower sensor units 120 and the vehicle traveling direction load Fx is obtained by comparing respective outputs the forward and rearward sensor units 120. The axial direction load Fy is obtained by comparing respective outputs of the four sensor units 120. Calculation of the above described loads Fx, Fy and Fz by the signal processing unit 130 can be accurately performed if arithmetic expressions and parameters are set on the basis of values obtained through a series of experiments and simulations, It is to be noted that, although various corrections are more specifically performed in the above described calculation, those correction will be described later.

Figure 10:
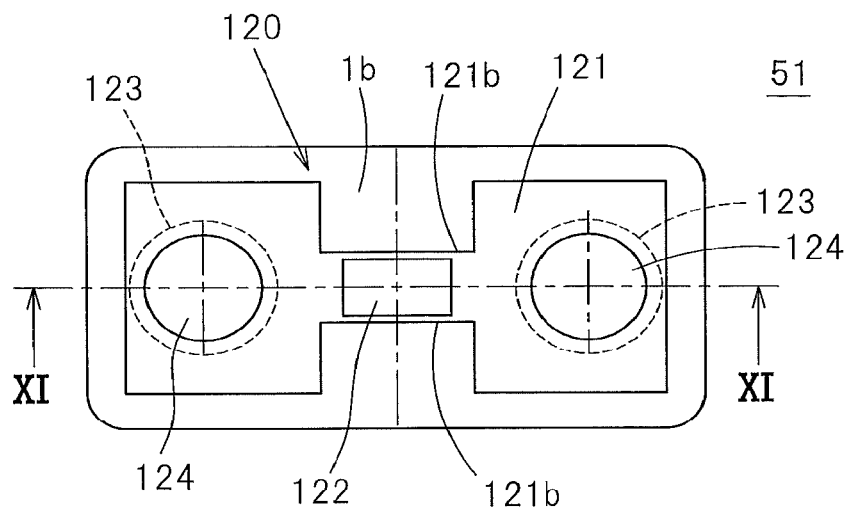
FIG. 10 is a top plan view showing, on an enlarged scale, a sensor unit employed in the electric vehicle.
Figure 11:
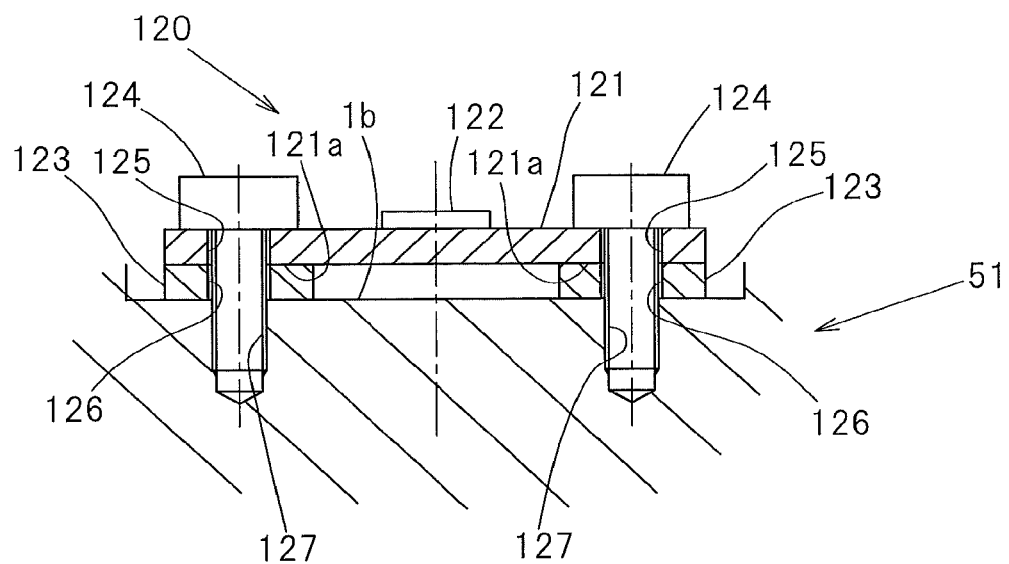
FIG. 11 is a longitudinal sectional view showing the sensor unit shown in FIG. 10.

Each of the above described sensor units 120 is made up of, for example, as shown in an enlarged top plan view of FIG. 10 and in an enlarged longitudinal sectional view of FIG. 11, a strain generating member 121 and a strain sensor 122 fitted to the strain generating member 121 for detecting a strain induced in the strain generating member 121. The strain generating member 121 is in the form of a thin plate member made of an elastically deformable metallic material such as, for example, a steel material and having a thickness smaller than 3 mm and has a general plane shape that represents a band shape of a uniform width over the entire length thereof with cutouts 121b formed opposite intermediate side edge portions thereof. Also, the strain generating member 121 has its opposite end portion provided with respective contact fixing portions 121a that are fixed to the outer diametric surface of the outer ring 1 in contact therewith with respective spacers 123 intervening therebetween. The strain sensor 122 is pasted to a portion of the strain generating member 121 where the strain is maximized relative to the load in various directions. In the instance now under discussion, for that portion of the strain generating member 121, an intermediate center area on an outer surface side of the strain generating member 121, which is bound between the cutouts 121b at the opposite side portions thereof, is selected and the strain sensor 122 accordingly detects the strain in the neighborhood of the cutouts 121b in the circumferential direction.

The sensor unit 120 referred to above is so disposed that the two contact fixing portions 121a of the strain generating member 121 are disposed at respective positions of the same dimension in an axial direction of the outer member 1 while the contact fixing segments 121a are spaced from each other in the circumferential direction and the contact fixing portions 121a are fixed to the outer diametric surface of the outer ring by means of bolts 124 with spacers 123 intervening therebetween. Each of the bolts 124 referred to above is inserted from a bolt insertion hole 125, defined in the associated contact fixing portion 121a so as to extend therethrough in a radial direction, into a bolt insertion hole 126 in the corresponding spacer 123 and is then threaded into a screw hole 127 defined in an outer peripheral portion of the outer member 51.

As described above, with the contact fixing portions 121a fixed to the outer diametric surface of the outer member 51 through the spacers 123, the intermediate center area formed with the cutouts 121b of the strain generating member 121, which is in the form of a thin plate, adjacent the cutouts 121b is held in a condition separated from the outer diametric surface of the outer ring 1 and a strain deformation in the neighborhood of the cutouts 121b is therefore facilitated. As the positions in the axial direction, at which the contact fixing portions 121a are disposed, axial positions which form neighborhoods of the rolling surface 53 of the outboard row in the outer member 51 is chosen in the instance now under discussion. It is to be noted that the neighborhood of the rolling surface 53 of the outboard row referred to above and hereinafter is to be understood as encompassing a region ranging from a position intermediate between the rolling surfaces 53 of the inboard and outboard rows to an area where the rolling surface 53 of the outboard row is formed. A flat area 1b is formed at a site of the outer diametric surface of the outer member 51, where the corresponding spacer 123 is fixed in contact therewith.

As the strain sensor 122, any of various types can be employed. For example, the strain sensor 122 may be comprised of a metallic foil strain gauge. In such case, to the strain generating member 121 fixture is generally performed by means of bonding. Also, the strain sensor 122 can be formed by a thick film resistance element on the strain generating member 121.

Figure 12:
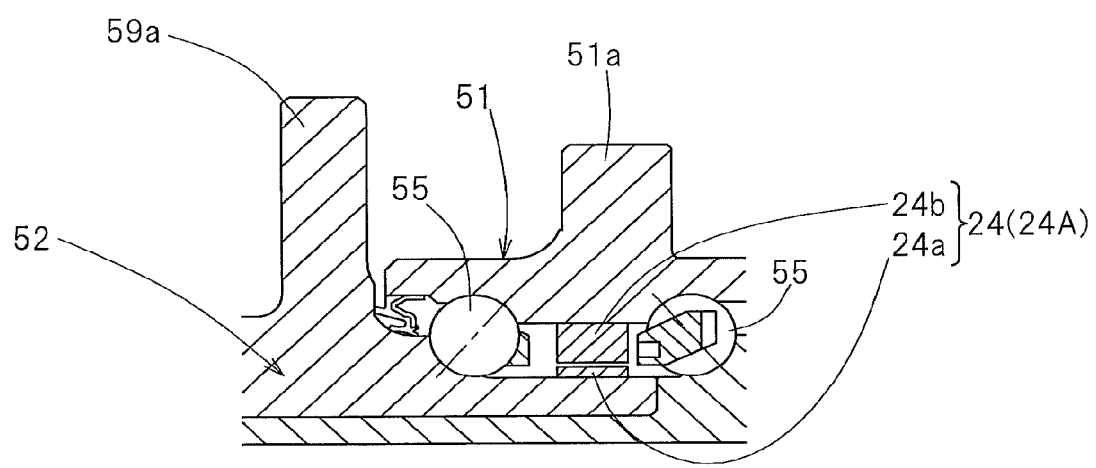
FIG. 12 is a longitudinal sectional view showing one example of a rotation sensor used in the electric vehicle.

FIG. 12 illustrates one example of the rotation sensor 24 shown in FIGS. 1 and 2. This rotation sensor 24 is made up of a magnetic encoder 24a, provided in the outer periphery of the inner member 52 in the wheel bearing assembly 4, and a magnetic sensor 24b provided in the outer member 51 in face to face relation with the magnetic encoder 24a. The magnetic encoder 24a is in the form of a ring shaped member having magnetic poles N and S magnetized alternately in a circumferential direction thereof. In the example as shown, the rotation sensor 24 is disposed between the rolling elements 55 and 55 of both rows, it may be disposed at one end portion of the wheel bearing assembly 4.

It is to be noted that in describing the foregoing embodiment, the ECU 21 and the inverter 22, both shown in FIGS. 1 and 2, have been shown and described as separated from each other, but the ECU 21 and the inverter 22 may be formed of the same computer. Also, although the description is made with respect to the electric vehicle in which all of the four wheels are driven by the motors in describing the foregoing embodiment, the present invention can be equally applied to a four wheeled electric vehicle of a type in which front or rear two wheels, for example, are rendered to be driven wheels.

Although the present invention has been fully described in connection with the embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

Reference Numerals

1 . . . Vehicle body
2, 3 . . . Wheel
4 . . . Wheel bearing assembly
6 . . . Motor
7 . . . Reducer
8 . . . In-wheel motor drive system
9, 10 . . . Mechanical brake
20 . . . Motor control device
21 . . . ECU
22 . . . Inverter unit
24 . . . Rotation sensor
28 . . . Power circuitry
29 . . . Motor control circuitry
30 . . . In-wheel motor unit
31 . . . Inverter
32 . . . PWM driver
33 . . . Motor drive controller
34 . . . Motor error check controller
35 . . . Current sensor
36 . . . Angle sensor
37 . . . Motor abnormality detector
38 . . . One side abnormality response controller
47 . . . Abnormality notifier

What is claimed is:

1. An electric vehicle comprising:
   wheels including a left front wheel and a left rear wheel arranged on a left side of the electric vehicle, and a right front wheel and a right rear wheel arranged on a right side of the electric vehicle,
   a plurality of motors to individually drive the wheels of the vehicle;
   a motor control device to control the plurality of motors;
   a motor abnormality detector to detect an abnormality occurring in each of the motors; and
   a one side abnormality response controller to control, in the event that an abnormality other than a motor stoppage, occurring in one motor of the motors for one wheel on one side of the electric vehicle left which are arranged at the same forward or rearward position of the vehicle, is detected by the motor abnormality detector, only the other motor for the other wheel, in which no abnormality has been detected, on the other side of electric vehicle, which are arranged at the same forward or rearward position, so that an operating condition of the other motor for the other wheel approaches the same operating condition as that of the one motor in which the abnormality has been detected,
   wherein the one side abnormality response controller does not control the other motors for the other three wheels besides the one of the motors so controlled.

2. The electric vehicle as claimed in claim 1, wherein the one side abnormality response controller is configured to perform, in the event that the abnormality detected by the motor abnormality detector is a generation of a braking force on the one motor, to perform either one of a control to forcibly reduce a torque of the other motor, that is arranged at the same forward or rearward position, a control to operate the other motor as a regenerative brake, and a control to actuate a brake to the other wheel that is driven by the other motor.

3. The electric vehicle as claimed in claim 1, wherein the motor abnormality detector detects the abnormality by comparing one of a motor current, a rotation number of the motor, a torque command value sent to an inverter unit for motor driving, and a load detection value of a load sensor fitted to a wheel bearing assembly that detects an acting load between a tire and a road surface of the motors, that drive either the front and rear or left and right neighboring wheels relative to the wheel that is driven by the motor to be detected, with one of a motor current, a rotation number of the motor, a torque command value sent to the inverter unit for motor driving and a load detection value in the motor to be detected.

4. The electric vehicle as claimed in claim 1, wherein the motor abnormality detector determines the occurrence of the abnormality in the event that a motor current detected attains a value equal to or higher than a predetermined multiple number of a motor current value corresponding to a torque command value sent to the inverter unit for motor driving.

5. The electric vehicle as claimed in claim 1, wherein the motor abnormality detector determines the occurrence of the abnormality in the event that, where a motor current value is substantially equal to a motor current value corresponding to the torque command value sent to the inverter unit for motor driving, the rotation number of the motor to be detected attains a value equal to or higher than a predetermined multiple number of the rotation number of the motor in the front and rear or left and right neighboring wheels relative to the wheel that is driven by this motor.

6. The electric vehicle as claimed in claim 1, wherein the motor abnormality detector determines the occurrence of the abnormality in the event that, where the motor current value is substantially equal to the motor current value corresponding to the torque command value sent to the inverter unit for motor driving, a detection load Fx in a vehicle traveling direction in a load sensor fitted to a wheel bearing assembly, which is connected with the motor to be detected, that detects an acting load between a tire and a road surface attains a value equal to a predetermined multiple number relative to a detection load Fx in the vehicle traveling direction in the load sensor that detects acting load between the tire and the road surface, which sensor is fitted to a wheel bearing assembly of the front and rear or left and right neighboring wheels relative to the wheel that is driven by the motor to be detected as to the abnormality.

7. The electric vehicle as claimed in claim 1, further comprising an ECU that is an electric control unit to control the vehicle in general,
wherein the motor control device includes the ECU and an inverter unit including a power circuitry including an inverter to convert a direct current power into an alternating current power and a motor control circuitry to control the power circuitry in accordance with a torque command sent from the ECU, and
wherein the inverter unit is provided for each motor, and the motor abnormality detector and the one side abnormality responsive unit are provided in the motor control circuitry of the inverter unit.

8. The electric vehicle as claimed in claim 7, wherein the motor abnormality detector and the one side abnormality response controller are provided in each of the inverter units.

9. The electric vehicle as claimed in claim 1, further comprising an ECU that is an electric control unit to control the vehicle in general, and an inverter unit including a power circuitry including an inverter to convert a direct current power into an alternating current power and a motor control circuitry to control the power circuitry in accordance with a torque command sent from the ECU, wherein the inverter unit is provided for each motor, the ECU and the inverter unit cooperate with each other to form the motor control device, and the motor abnormality detector is provided in the motor control circuitry of the inverter unit and the one side abnormality responsive unit is provided in the ECU.

10. The electric vehicle as claimed in claim 1, wherein each of the motors forms a part of an in-wheel motor drive system including a wheel bearing assembly and a reducer interposed between the wheel bearing assembly and the motor.

11. The electric vehicle as claimed in claim 10, wherein the reducer is a cycloid reducer.

\* \* \* \* \*

UNITED STATES PATENT AND TRADEMARK OFFICE
CERTIFICATE OF CORRECTION

| | | Page 1 of 1 |
|---|---|---|
| PATENT NO. | : 9,126,599 B2 | |
| APPLICATION NO. | : 14/003413 | |
| DATED | : September 8, 2015 | |
| INVENTOR(S) | : Ozaki | |

It is certified that error appears in the above-identified patent and that said Letters Patent is hereby corrected as shown below:

In the claims

Claim 1, Column 18, Line 37

Delete "vehicle left" and insert --vehicle,--, therefor.

Claim 1, Column 18, Line 41

Delete "of" and insert --of the--, therefor.

Signed and Sealed this
Eighth Day of December, 2015

Michelle K. Lee
*Director of the United States Patent and Trademark Office*